(12) United States Patent
Wang et al.

(10) Patent No.: US 11,591,727 B2
(45) Date of Patent: Feb. 28, 2023

(54) AUTOMATIC CIRCUMFERENTIAL INSERTION APPARATUS AND METHOD FOR COMPLEX ROTARY PREFORM

(71) Applicant: NANJING UNIVERSITY OF AERONAUTICS AND ASTRONAUTICS, Nanjing (CN)

(72) Inventors: Jun Wang, Nanjing (CN); Zhongde Shan, Nanjing (CN); Xiaokang Ma, Nanjing (CN); Yaoyao Wang, Nanjing (CN); Haoqin Yang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/707,912

(22) Filed: Mar. 29, 2022

(65) Prior Publication Data
US 2022/0219414 A1  Jul. 14, 2022

(51) Int. Cl.
| | | |
|---|---|---|
| *D04C 3/14* | (2006.01) | |
| *D04C 3/48* | (2006.01) | |
| *D04C 3/24* | (2006.01) | |
| *B29C 70/24* | (2006.01) | |

(52) U.S. Cl.
CPC ............... *D04C 3/14* (2013.01); *D04C 3/24* (2013.01); *D04C 3/48* (2013.01); *B29C 70/24* (2013.01)

(58) Field of Classification Search
CPC ... D04C 3/14; D04C 3/16; D04C 3/18; D04C 3/24; D04C 3/48
See application file for complete search history.

(56) References Cited

U.S. PATENT DOCUMENTS

| | | | | |
|---|---|---|---|---|
| 1,418,521 A | * | 6/1922 | Eugenturck | D04C 3/34 87/34 |
| 2,167,930 A | * | 8/1939 | Krissiep | D04C 3/16 87/22 |
| 2,653,506 A | * | 9/1953 | Robert | D04C 3/00 87/31 |
| 3,004,463 A | * | 10/1961 | Griesemer | D04C 3/18 87/56 |
| 4,092,897 A | * | 6/1978 | Lalikos | D04C 3/40 87/6 |

(Continued)

FOREIGN PATENT DOCUMENTS

| | | |
|---|---|---|
| CN | 103276527 A | 9/2013 |
| CN | 107460627 A | 12/2017 |
| JP | 2015101792 A | 6/2015 |

*Primary Examiner* — Shaun R Hurley

(57) ABSTRACT

An automatic circumferential insertion apparatus and method for a complex rotary preform. The apparatus includes a double-hinge yarn carrier and a U-shaped bracket. Two ends of the double-hinge yarn carrier are respectively provided with a cylindrical hinge structure. One cylindrical hinge structure is in revolving pair connection with an outer clamping buckle at one end of the U-shaped bracket, and the other cylindrical hinge structure is in revolving pair connection with an inner clamping buckle at the other end of the U-shaped bracket. Two sides of the U-shaped bracket are provided with an electromagnet, respectively. The outer clamping buckle is provided with a pin, which is controlled by triggering, and is triggered simultaneously with the electromagnet at the side where the outer clamping buckle is arranged.

7 Claims, 2 Drawing Sheets

(56) References Cited

U.S. PATENT DOCUMENTS

| | | | | |
|---|---|---|---|---|
| 5,361,674 A | * | 11/1994 | Akiyama | D04C 3/48 87/9 |
| 6,024,005 A | * | 2/2000 | Uozomi | D04C 3/34 87/29 |
| 8,813,626 B2 | * | 8/2014 | Huang | D04C 3/48 87/34 |
| 2010/0037759 A1 | * | 2/2010 | Baeomer | D04C 3/16 87/57 |
| 2011/0005371 A1 | * | 1/2011 | Giebels | D04C 1/02 87/62 |
| 2013/0164473 A1 | * | 6/2013 | Feeney | D04C 1/02 29/446 |
| 2014/0137722 A1 | | 5/2014 | Huang | |
| 2017/0298546 A1 | * | 10/2017 | Reinisch | D04C 3/48 |

* cited by examiner

AUTOMATIC CIRCUMFERENTIAL INSERTION APPARATUS AND METHOD FOR COMPLEX ROTARY PREFORM

CROSS-REFERENCE TO RELATED APPLICATIONS

This application claims the benefit of priority from Chinese Patent Application No. 202110577378.8, filed on May 26, 2021. The content of the aforementioned application, including any intervening amendments thereto, is incorporated herein by reference.

TECHNICAL FIELD

This application relates to three-dimensional (3D) braiding of composite materials, and more particularly to an automatic circumferential insertion apparatus and method for a complex rotary preform.

BACKGROUND

The 3D braided composite material has been widely used in military and civilian fields owing to its outstanding mechanical properties and lightweight structure.

3D four-directional and five-directional braiding technologies have achieved significant development in the past two or three decades. Currently, the 3D four-directional braided structure is more popularized, in which the internal braiding bundles extend along four directions and intersect with each other, and all braiding bundles each form an angle with the braiding direction and are isotropic.

The arrangement of fibers along a thickness direction enhances the mechanical properties of the composite along this direction. Based on the four-directional braiding structure, additional braiding bundles can be introduced in other directions to form a 3D five-directional, six-directional and more-directional braided structure, further strengthening the mechanical performance of the composites.

SUMMARY

An object of this disclosure is to provide an automatic circumferential insertion apparatus and method for a complex rotary preform to overcome the deficiencies in the prior art. This application enables the automatic circumferential insertion of yarns into the 3D four-directional, five-directional, or more-directional braided structure, which can greatly increase the 3D braiding efficiency of composites and enhance the interlaminar shear strength (ILSS) and the circumferential performance, allowing for a 3D braided composite with enhanced overall mechanical performance.

The technical solutions of the disclosure are described below.

In a first aspect, the disclosure provides an automatic circumferential insertion apparatus for a complex rotary preform, comprising:

a double-hinge yarn carrier; and
a U-shaped bracket;

wherein one end of the double-hinge yarn carrier is provided with a first hinge structure, and the other end of the double-hinge yarn carrier is provided with a second hinge structure; the first hinge structure and the second hinge structure are both cylindrical; one end of the U-shaped bracket is provided with a third hinge structure, and the other end of the U-shaped bracket is provided with a fourth hinge structure; the first hinge structure is in revolute pair connection with the third hinge structure; and the second hinge structure is in revolute pair connection with the fourth hinge structure;

the third hinge structure is configured as an outer clamping buckle, and the fourth hinge structure is configured as an inner clamping buckle; at least one of the first hinge structure and the second hinge structure is connected to the U-shaped bracket during an operation of the double-hinge yarn carrier;

one side of the U-shaped bracket where the outer clamping buckle is arranged is provided with a first electromagnet, and one side of the U-shaped bracket where the inner clamping buckle is arranged is provided with a second electromagnet; the first electromagnet and the second electromagnet are respectively matched with an electromagnet arranged on the double-hinge yarn carrier to achieve a handshake motion between the double-hinge yarn carrier and the U-shaped bracket; and the outer clamping buckle is provided with a pin of the outer clamping buckle to prevent the double-hinge yarn carrier from falling away from the U-shaped bracket during a hand-changing motion; and the pin of the outer clamping buckle is controlled by trigging, and is triggered simultaneously with the first electromagnet.

In some embodiments, the automatic circumferential insertion apparatus further comprising:

a front stop pin;
a bias yarn; and
a rear stop pin;

wherein the front stop pin is arranged in front of one side of the bias yarn, and is close to the bias yarn; the rear stop pin is arranged behind the other side of the bias yarn, and is close to the bias yarn; and the front stop pin and the rear stop pin are configured to play a role in assisting the hand-changing action of the double-hinge yarn carrier, and protect the bias yarn from being damaged by the double-hinge yarn carrier.

In some embodiments, the outer clamping buckle of the U-shaped bracket comprises a first tension spring, the pin of the outer clamping buckle, a third electromagnet, and the first electromagnet;

the inner clamping buckle of the U-shaped bracket comprises the second electromagnet, a pin of the inner clamping buckle and a second tension spring;

the pin of the outer clamping buckle is configured to work when the U-shaped bracket moves forward, and reset when the U-shaped bracket moves backward;

the pin of the inner clamping buckle is configured to work when the U-shaped bracket moves backward, and reset when the U-shaped bracket moves forward;

the first electromagnet is configured to be powered on when the U-shaped bracket moves forward, and powered off when the U-shaped bracket moves backward; and the second electromagnet is configured to be powered on when the U-shaped bracket moves backward, and powered off when the U-shaped bracket moves forward.

In some embodiments, the first electromagnet has a repulsive interaction with the electromagnet arranged on the double-hinge yarn carrier, and the second electromagnet has an attractive interaction with the electromagnet arranged on the double-hinge yarn carrier.

In a second aspect, the disclosure provides an automatic circumferential insertion method for a complex rotary preform using the automatic circumferential insertion apparatus, comprising:

(S1) allowing the double-hinge yarn carrier to move forward with the U-shaped bracket; and stopping the double-hinge yarn carrier by the front stop pin to perform a first release action;

(S2) allowing the double-hinge yarn carrier to continue moving forward with the U-shaped bracket, so as to reset the double-hinge yarn carrier to an initial state to complete a first handshake motion;

(S3) allowing the double-hinge yarn carrier to move backward with the U-shaped bracket; and stopping the double-hinge yarn carrier by the rear stop pin to perform a second release action;

wherein the first handshake motion and the second release action constitute the hand-changing action of the double-hinge yarn carrier; and (S4) allowing the double-hinge yarn carrier to continue moving backward with the U-shaped bracket to reset the double-hinge yarn carrier to the initial state to complete a second handshake motion; and preparing for a next cycle of motion.

In some embodiments, when the U-shaped bracket is in a forward stroke, a third electromagnet of the outer clamping buckle and the first electromagnet are powered on; the outer clamping buckle is blocked by the first pin under an action of the third electromagnet, so as to prevent the outer clamping buckle from falling away from the first hinge structure of the double-hinge yarn carrier; the electromagnet arranged on the double-hinge yarn carrier is affected by a repulsion force of the first electromagnet, and when the double-hinge yarn carrier passes over the front stop pin to reset to a handshake state; and after the forward stroke is completed, the third electromagnet and the first electromagnet are powered off, and a pin of the outer clamping buckle is restored to a reset state under a pulling force of a tension spring of the outer clamping buckle.

In some embodiments, when the U-shaped bracket is in a backward stroke, the second electromagnet is powered on; the inner clamping buckle is blocked by a pin of the inner clamping buckle under an action of the second electromagnet, so as to prevent the inner clamping buckle from falling away from the second hinge structure of the double-hinge yarn carrier; the electromagnet arranged on the double-hinge yarn carrier is attracted by the second electromagnet, and when the double-hinge yarn carrier passes over the rear stop pin to reset to a handshake state; and after the backward stroke is completed, the second electromagnet is powered off, and the pin of the inner clamping buckle is restored to a reset state under a pulling force of a tension spring of the inner clamping buckle.

Compared to the prior art, the present disclosure has the following beneficial effects.

A double-hinge yarn carrier with a hand-changing function is provided herein, which can complete the automatic circumferential yarn arrangement in the 3D braiding, further enhancing the mechanical properties of the 3D braided composite material. Particularly, the double-hinge yarn carrier can automatically introduce the circumferential yarn arrangement into the four-directional, five-directional, and more-directional braided composites, thus greatly improving the mechanical properties of the 3D braided composite material. Through the apparatus and method provided herein, the automatic operation of the circumferential yarn arrangement in the 3D braiding can be achieved, which improves the working efficiency of the 3D braiding.

Figure 1:
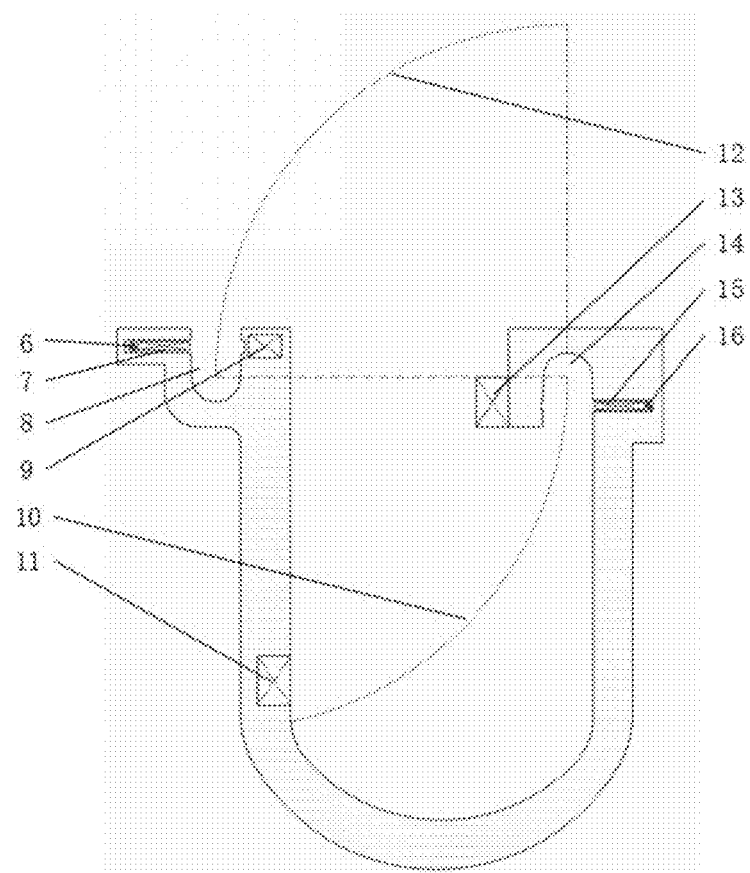
FIG. 1 is a structural diagram of a U-shaped bracket according to an embodiment of the present disclosure.

In the drawings: 1, U-shaped bracket; 2, double-hinge yarn carrier; 3, front stop pin; 4, bias yarn; 5, rear stop pin; 6, first tension spring; 7, pin of the outer clamping buckle; 8, outer clamping buckle; 9, third electromagnet; 10, first motion path; 11, first electromagnet; 12, second motion path; 13, second electromagnet; 14, inner clamping buckle; 15, pin of the inner clamping buckle; 16, second tension spring; 17, first cylindrical structure; 18, yarn-carrying part; 19, fourth electromagnet; and 20, second cylindrical structure.

DETAILED DESCRIPTION OF EMBODIMENTS

Technical solutions of the present disclosure will be described in detail below with reference to the accompanying drawings and embodiments.

An automatic circumferential insertion apparatus for a complex rotary preform is provided herein, which includes a double-hinge yarn carrier 2 and a U-shaped bracket 1.

Figure 2:
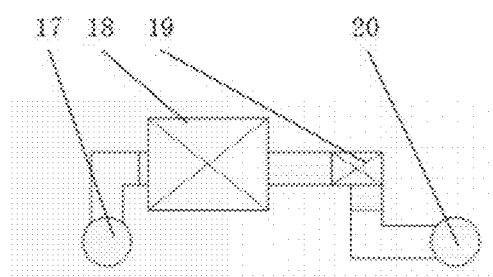
FIG. 2 is a structural diagram of a double-hinge yarn carrier according to an embodiment of the present disclosure.

Referring to an embodiment shown in FIGS. 1-2, one end of the double-hinge yarn carrier 2 is provided with a first hinge structure, and the other end of the double-hinge yarn carrier 2 is provided with a second hinge structure. The first hinge structure and the second hinge structure are both cylindrical. One end of the U-shaped bracket 1 is provided with a third hinge structure, and the other end of the U-shaped bracket 1 is provided with a fourth hinge structure. The first hinge structure is in revolute pair connection with the third hinge structure, and the second hinge structure is connected to the fourth hinge structure to form a second revolute pair.

The third hinge structure is configured as an outer clamping buckle 8, and the fourth hinge structure is configured as an inner clamping buckle 14. At least one of the first hinge structure and the second hinge structure is connected to the U-shaped bracket 1 during an operation of the double-hinge yarn carrier 2.

One side of the U-shaped bracket 1 where the outer clamping buckle 8 is arranged is provided with a first electromagnet 11, and one side of the U-shaped bracket 1 where the inner clamping buckle 14 is arranged is provided with a second electromagnet 13. The first electromagnet 11 and the second electromagnet 13 are respectively matched with a fourth electromagnet 19 arranged on the double-hinge yarn carrier to achieve a handshake motion between the double-hinge yarn carrier and the U-shaped bracket. The outer clamping buckle 8 is provided with a pin of the outer clamping buckle 7 to prevent the double-hinge yarn carrier from falling away from the U-shaped bracket during a hand-changing motion The pin of the outer clamping buckle 7 is controlled by trigging, and is triggered simultaneously with the first electromagnet 11.

In an embodiment, the automatic circumferential insertion apparatus further includes a front stop pin 3, a bias yarn 4, and a rear stop pin 5. The front stop pin 3 is arranged in front of one side of the bias yarn 4, and is close to the bias yarn 4. The rear stop pin 5 is arranged behind the other side of the bias yarn 4, and is close to the bias yarn 4. The front stop pin 3 and the rear stop pin 5 are configured to play a role in assisting the hand-changing action of the double-hinge yarn carrier 2, and protect the bias yarn 4 from being damaged by the double-hinge yarn carrier 2.

In an embodiment, the outer clamping buckle 8 of the U-shaped bracket 1 includes a first tension spring 6, the pin of the outer clamping buckle 7, a third electromagnet, and the first electromagnet.

The pin of the outer clamping buckle 7 works when the U-shaped bracket 1 moves forward, and the pin of the outer clamping buckle 7 resets when the U-shaped bracket 1 moves backward.

The pin of the inner clamping buckle 15 works when the U-shaped bracket 1 moves backward, and the pin of the inner clamping buckle 15 resets when the U-shaped bracket 1 moves forward.

The first electromagnet 11 is powered on when the U-shaped bracket 1 moves forward, and the first electromagnet 11 is powered off when the U-shaped bracket 1 moves backward.

The second electromagnet 13 is powered on when the U-shaped bracket 1 moves backward, and the second electromagnet 13 is powered off when the U-shaped bracket 1 moves forward.

In an embodiment, the first electromagnet 11 has a repulsive interaction with the fourth electromagnet 19 arranged on the double-hinge yarn carrier 2, and the second electromagnet 13 has an attractive interaction with the fourth electromagnet 19 arranged on the double-hinge yarn carrier.

Figure 3:
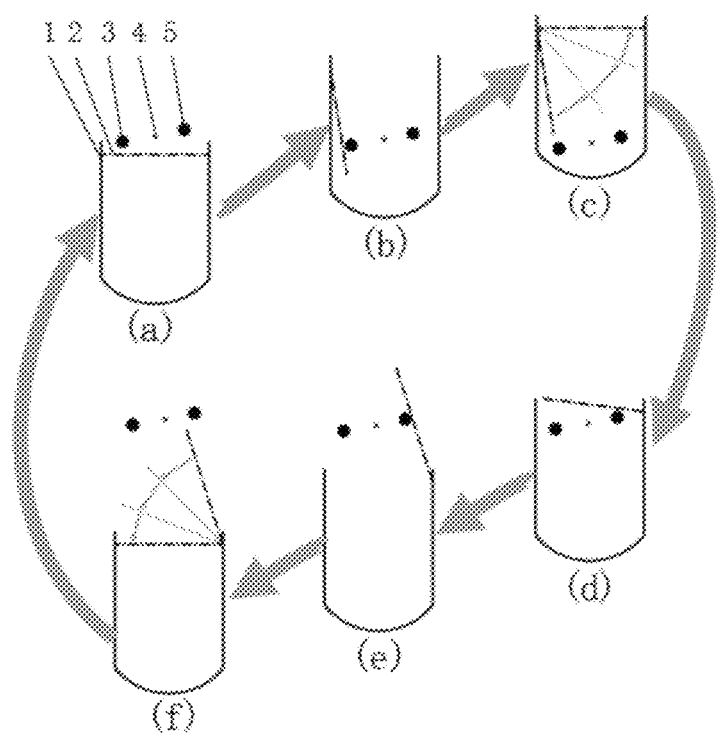
FIG. 3 is a flow chart of an automatic circumferential insertion method for a complex rotary preform according to an embodiment of the present disclosure.

An automatic circumferential insertion method for a complex rotary preform using the automatic circumferential insertion apparatus is illustrated in FIG. 3, which includes the following steps.

(S1) The double-hinge yarn carrier 2 is allowed to move forward with the U-shaped bracket 1 from (a) to (b), then is stopped by a rear stop pin 5 to perform a first release action. During this process, the yarn carrier of the outer clamping buckle 8 experiences a first motion path 10.

(S2) The double-hinge yarn carrier 2 is allowed to continue moving forward with the U-shaped bracket 1 from (b) to (c), so as to reset the double-hinge yarn carrier 2 to an initial state to complete a first handshake motion.

(S3) The double-hinge yarn carrier 2 is allowed to move backward with the U-shaped bracket 1 from (c) to (d), then is stopped by the rear stop pin 5 to perform a second release action, where the yarn carrier of the inner clamping buckle 14 experiences a second motion path 12. The first handshake motion and the second release action constitute the hand-changing action of the double-hinge yarn carrier 2.

(S4) The double-hinge yarn carrier 2 is allowed to continue moving backward with the U-shaped bracket 1, so as to reset a yarn-carrying part 18 to the initial state to complete a second handshake motion and ready to enter a next cycle of motion.

The front stop pin 3 is arranged in front of one side of the bias yarn 4, and is close to the bias yarn 4. The rear stop pin 5 is arranged behind the other side of the bias yarn 4, and is close to the bias yarn. The front stop pin 3 and the rear stop pin 5 are configured to play a role in assisting the hand-changing action of the double-hinge yarn carrier 2, and protect the bias yarn 4 from being damaged by the double-hinge yarn carrier 2.

FIG. 1 is a structural diagram of a U-shaped bracket, and FIG. 2 is a structural diagram of a double-hinge yarn carrier.

When the U-shaped bracket 1 is in a forward stroke, a third electromagnet 9 and the first electromagnet 11 are powered on. The outer clamping buckle 8 is blocked by the pin of the outer clamping buckle 7 under an action of the third electromagnet 9, so as to prevent the outer clamping buckle 8 from falling away from the first hinge structure 17 of the double-hinge yarn carrier 2. The fourth electromagnet 19 arranged on the double-hinge yarn carrier 2 is affected by a repulsion force of the first electromagnet 11, and the double-hinge yarn carrier 2 passes over the front stop pin 3 to reset to a handshake state. After the forward stroke is completed, the third electromagnet 9 and the first electromagnet 11 are powered off, and the pin of the outer clamping buckle 7 is restored to a reset state under a pulling force of a first tension spring 6.

When the U-shaped bracket 1 is in a backward stroke, the second electromagnet 13 is powered on. The inner clamping buckle 14 is blocked by a pin of the inner clamping buckle 15 under an action of the second electromagnet 13, so as to prevent the inner clamping buckle 14 from falling away from the second cylindrical structure 20 of the double-hinge yarn carrier. The electromagnet 19 arranged on the double-hinge yarn carrier 2 is attracted by the second electromagnet 13, and the double-hinge yarn carrier 2 passes over the rear stop pin 5 to reset to a handshake state. After the backward stroke is completed, the second electromagnet 13 is powered off, and the pin of the inner clamping buckle 15 is restored to a reset state under a pulling force of a second tension spring 16.

This application realizes the alternation among the handshake motion, release motion, and hand-changing motion of double-hinge yarn carrier and the automatic circumferential yarn arrangement, which can introduce the circumferential yarn arrangement based on the 3D five-directional braiding, 3D six-directional braiding, and 3D seven-directional braiding, thus greatly improving the mechanical properties of the 3D braiding composite material and the braiding efficiency of the 3D braiding.

It should be noted that these embodiments are only illustrative, and are not intended to limit the present disclosure. It should be understood that any modifications and changes made by those skilled in the art without departing from the spirit and scope of the disclosure shall fall within the scope of the present disclosure defined by the appended claims.

What is claimed is:

1. An automatic circumferential insertion apparatus for a complex rotary preform, comprising:
    a double-hinge yarn carrier; and
    a U-shaped bracket;
    wherein one end of the double-hinge yarn carrier is provided with a first hinge structure, and the other end of the double-hinge yarn carrier is provided with a second hinge structure; the first hinge structure and the second hinge structure are both cylindrical; one end of the U-shaped bracket is provided with a third hinge structure, and the other end of the U-shaped bracket is provided with a fourth hinge structure; the first hinge structure is in revolving pair connection with the third hinge structure; and the second hinge structure is in revolving pair connection with the fourth hinge structure;
    the third hinge structure is configured as an outer clamping buckle, and the fourth hinge structure is configured as an inner clamping buckle; at least one of the first hinge structure and the second hinge structure is connected to the U-shaped bracket during an operation of the double-hinge yarn carrier;
    one side of the U-shaped bracket where the outer clamping buckle is arranged is provided with a first electromagnet, and one side of the U-shaped bracket where the inner clamping buckle is arranged is provided with a second electromagnet; the first electromagnet and the second electromagnet are respectively matched with an electromagnet arranged on the double-hinge yarn carrier to achieve a handshake motion between the double-hinge yarn carrier and the U-shaped bracket; and the outer clamping buckle is provided with a pin of the outer clamping buckle to prevent the double-hinge yarn carrier from falling away from the U-shaped bracket during a hand-changing motion; and the pin of the outer clamping buckle is controlled by triggering, and is triggered simultaneously with the first electromagnet.

2. The automatic circumferential insertion apparatus of claim 1, further comprising:

a front stop pin;

a bias yarn; and a rear stop pin;

wherein the front stop pin is arranged in front of one side of the bias yarn, and is close to the bias yarn; the rear stop pin is arranged behind the other side of the bias yarn, and is close to the bias yarn; and the front stop pin and the rear stop pin are configured to play a role in assisting the hand-changing action of the double-hinge yarn carrier, and protect the bias yarn from being damaged by the double-hinge yarn carrier.

3. An automatic circumferential insertion method for a complex rotary preform using the automatic circumferential insertion apparatus of claim 2, comprising:

(S1) allowing the double-hinge yarn carrier to move forward with the U-shaped bracket; and stopping the double-hinge yarn carrier by the front stop pin to perform a first release action;

(S2) allowing the double-hinge yarn carrier to continue moving forward with the U-shaped bracket, so as to reset the double-hinge yarn carrier to an initial state to complete a first handshake motion;

(S3) allowing the double-hinge yarn carrier to move backward with the U-shaped bracket; and stopping the double-hinge yarn carrier by the rear stop pin to perform a second release action;

wherein the first handshake motion and the second release action constitute the hand-changing action of the double-hinge yarn carrier; and (S4) allowing the double-hinge yarn carrier to continue moving backward with the U-shaped bracket to reset the double-hinge yarn carrier to the initial state to complete a second handshake motion; and preparing for a next cycle of motion.

4. The automatic circumferential insertion method of claim 3, wherein when the U-shaped bracket is in a forward stroke, a third electromagnet of the outer clamping buckle and the first electromagnet are powered on; the outer clamping buckle is blocked by the first pin under an action of the third electromagnet, so as to prevent the outer clamping buckle from falling away from the first hinge structure of the double-hinge yarn carrier; the electromagnet arranged on the double-hinge yarn carrier is affected by a repulsion force of the first electromagnet, and when the double-hinge yarn carrier passes over the front stop pin to reset to a handshake state; and after the forward stroke is completed, the third electromagnet and the first electromagnet are powered off, and a pin of the outer clamping buckle is restored to a reset state under a pulling force of a tension spring of the outer clamping buckle.

5. The automatic circumferential insertion method of claim 3, wherein when the U-shaped bracket is in a backward stroke, the second electromagnet is powered on; the inner clamping buckle is blocked by a pin of the inner clamping buckle under an action of the second electromagnet, so as to prevent the inner clamping buckle from falling away from the second hinge structure of the double-hinge yarn carrier; the electromagnet arranged on the double-hinge yarn carrier is attracted by the second electromagnet, and when the double-hinge yarn carrier passes over the rear stop pin to reset to a handshake state; and after the backward stroke is completed, the second electromagnet is powered off, and the pin of the inner clamping buckle is restored to a reset state under a pulling force of a tension spring of the inner clamping buckle.

6. The automatic circumferential insertion apparatus of claim 1, wherein the outer clamping buckle of the U-shaped bracket comprises a first tension spring, the pin of the outer clamping buckle, a third electromagnet, and the first electromagnet;

the inner clamping buckle of the U-shaped bracket comprises the second electromagnet, a pin of the inner clamping buckle and a second tension spring;

the pin of the outer clamping buckle is configured to work when the U-shaped bracket moves forward, and reset when the U-shaped bracket moves backward;

the pin of the inner clamping buckle is configured to work when the U-shaped bracket moves backward, and reset when the U-shaped bracket moves forward;

the first electromagnet is configured to be powered on when the U-shaped bracket moves forward, and powered off when the U-shaped bracket moves backward; and the second electromagnet is configured to be powered on when the U-shaped bracket moves backward, and powered off when the U-shaped bracket moves forward.

7. The automatic circumferential insertion apparatus of claim 1, wherein the first electromagnet has a repulsive interaction with the electromagnet arranged on the double-hinge yarn carrier, and the second electromagnet has an attractive interaction with the electromagnet arranged on the double-hinge yarn carrier.

* * * * *